:
3,794,655
OPTICAL ANTIPODES D- AND L-N-BENZOYL-3,4-DIHYDROXYPHENYLALANINE AND A PROCESS FOR THEIR PREPARATION
Hans Schubel, Siegburg-Seligenthal, Paul Janssen, Bensberg-Refrath, and Heinz-Ratz, Troisdorf, Germany, assignors to Dynamit Nobel Aktiengesellschaft, Troisdorf, Germany
No Drawing. Filed Dec. 18, 1970, Ser. No. 99,527
Claims priority, application Germany, Dec. 20, 1969,
P 19 63 992.0
Int. Cl. C07c *103/30, 101/30;* C07d *43/24*
U.S. Cl. 260—284                                           6 Claims

ABSTRACT OF THE DISCLOSURE

Optical antipodes D- and L-N-benzoyl-3,4-dihydroxyphenylalanine of the formula:

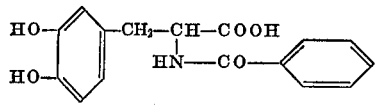

and the cinchonine salts thereof. These compounds are made by reacting chinchonine with D- and/or L-N-benzoyl-3,4-dihydroxyphenylalanine and then crystallizing the salt from mixtures of water with lower ketones, lower alkanols, lower ethers or mixtures thereof in order to separate and resolve the optical isomers. These salts are cleaved to the optically pure D- or L-N-benzoyl-3,4-dihydroxyphenylalanine which is itself cleaved to 3,4-dihydroxyphenylalanine.

---

The invention relates to the pure optical antipodes D- and L-N-benzoyl-3,4-dihydroxyphenylalanine, a process for their preparation, and their use in the preparation of D- and L-3,4-dihydroxyphenylalanine (D- and L-DOPA).

In this description and in the claims, all compounds from which dextrorotary 3,4-dihydroxyphenylalanine (D-DOPA) can be obtained are identified by the prefex D- and all those from which levorotary 3,4-dihydroxyphenylalanine (L-DOPA) develops are identified by the prefix L-.

It is already known (Harington and Randal, Biochem. J. 25, 1028 (1931)) that the diacetyl derivative of N-benzoyl - 3,4 - dihydroxyphenylalanine can be cleaved through the corresponding brucine salt to form the optically pure antipodes. This process, however, is a poor one since resolution of the product by crystallization takes place very slowly and cannot be completed even within fourteen days.

According to a process described by Yamada et al., Chem. Pharm. Bull. (Tokyo) 10, 680–688 (1962), the racemate cleavage has been performed by transforming racemic N-acetyl-3,4-methylenedioxyphenylalanine of the formula:

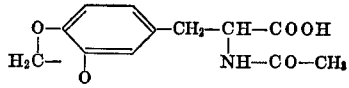

to the cinchonine salt and separating the latter into the optical antipodes by crystallization thereof from alcohol. In this process the L compound is obtained as a solution in alcohol, while the D compound crystallizes out.

Another prior-art process [Helv. Chim. Acta 35, 1776 (1952)] shows that the solubility behavior of the salts is completely altered by the use of a differently substituted starting material. In this process, the optical antipodes are separated by crystallizing the cinchonine salt of racemic N-benzoyl-3-methoxy - 4 - hydroxyphenylalanine out of pure acetone, the L compound being obtained as a difficultly soluble salt.

In the prior art process, the splitting off of the ether groups in the case of the 3,4-methylenedioxy compound is performed with hydroiodic acid and red phosphorus in acetic acid anhydride.

The processes mentioned, however, have the disadvantage that after resolution of the racemate it is still necessary to perform not only the cleavage of the salt and the saponification of the N-benzoyl radical, but also the splitting off of the ether groups, which involves a greater process cost and diminishes the yield.

It is an object of this invention to produce a novel salt of D- and L-N-benzoyl-3,4-dihydroxyphenylalanine.

It is another object of this invention to provide a novel process of producing 3,4-dihydroxyphenylalanine.

Other and additional objects of this invention will become apparent from a consideration of this entire specification and claims.

It has now been found that the racemate cleavage can be performed in a simple manner through the cinchonine salt of N-benzoyl-3,4-dihydroxyphenylalanine, this salt representing a new compound.

The subject of the invention is the optical antipodes D- and L-N-benzoyl-3,4-dihydroxyphenylalanine of the formula:

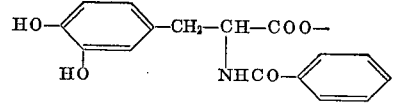

and the salts thereof with cinchonine.

The invention furthermore relates to a process for the isolation of the pure optical antipodes D- and L-N-benzoyl-3,4-dihydroxyphenylalanine, which is characterized by the fact that DL-N-benzoyl-3,4-dihydroxyphenylalanine is transformed to the corresponding cinchonine salt, the latter is dissociated to the optical antipodes by crystallization thereof from a homogenous liquid phase containing water and a lower aliphatic alcohol, ether or ketone with 2 to 8 carbon atoms or a mixture of such compounds excluding pure acetone, and the D- and L-cinchonine salt is dissociated, if desired, by reaction thereof with an acid or a base.

The invention furthermore relates to the use of these compounds for the preparation of D- and L-3,4-dihydroxy-phenylalanine.

The separation of the reacemate according to the invention with the use of the 3,4-dihydroxy compound has the advantage that the later splitting off of ether that is necessary in prior-art processes can be eliminated.

Surprisingly it has been found that, in contrast to the cinchonine salt of the corresponding 3-methoxy compound, the cinchonine salt of the 3,4-dihydroxy compound cannot be separated by crystallization from pure acetone, since both antipodes are substantially soluble in pure acetone.

Whereas in the prior-art dissociation of the 3-methoxy-4-hydroxy derivative by crystallization from acetone the L salt crystallizes, when this process is applied to the corresponding 3,4-dihydroxy derivative, the optical antipodes remain in solution or form syrupy precipitates which cannot be isolated.

Nevertheless, an easy cleavage of the racemates can be accomplished with an excellent yield if the cinchonine salt of N-benzoyl-3,4-dihydroxyphenylalanine is crystallized out of a homogenous mixture of a lower aliphatic ketone, alcohol or ether, or several such compounds, and water, especially a mixture of acetone and water.

The amount of water present in the solvent mixture is to be sufficient to provide at least 1 mole of water per mole of the N-benzoyl-DOPA. An excess of water, however, has no adverse effect on the separation of the racemate.

Expecially suitable for the purposes of the invention are mixtures of aliphatic ketones, alcohols and/or ethers having 2 to 6 carbon atoms, and water.

The liquid phase used for the crystallization must be homogenous. Therefore, if an alcohol, ether or ketone having excessively poor miscibility with water is used, an amount of a compound of the above-mentioned classes that is easily miscible with water must be added.

The preferred media have mole ratios of water to ketone of 1 to 2.5, water to alcohol of 1 to 0.5–3.0 or water to ether of 1 to 1.0–3.0. The dissolution of the salt can take place at ca. 40° C. to the boiling-point of the used mixture and the crystallization of one of the optical isomers from solution suitably takes place at the boiling-temperature of the mixture used to about −5° C.

A medium that is especially preferred for the performance of the process of the invention is aqueous acetone. Good results are also achieved with aqueous n-butanol, aqueous methyl ethyl ketone to which a small amount of isopropanol has been added, an aqueous mixture of isopropyl ether and isopropanol, aqueous isopropanol and aqueous ethanol.

For the practical performance of the process of the invention, first the cinchonine salt of DL-N-benzoyl-3,4-dihydroxyphenylalanine (DL-N-benzoyl-DOPA) is prepared. For this purpose the two salt-forming components can be reacted with one another in a suitable solvent such as methanol and the salt isolated by evaporation of the solvent. The salt forming reaction is carried out at ca. 20° C. to the boiling-temperature of the used solvent. This salt is then dissolved in the recrystallization aqueous solvent mixture, with heating if necessary.

An especially advantageous embodiment of the invention consists in heating equimolar amounts of cinchonine and DL-N-benzoyl-DOPA directly in the water-containing mixture used for the crystallization until the end of the reaction is indicated by a plainly visible transformation of the crystal structure. Generally this is accomplished by refluxing the reactants in the solvent-and-water mixture.

By letting the mixture stand, crystals of the cinchonine salt of D-N-benzoyl-DOPA are obtained, which are filtered from the solution.

The corresponding salt of the L compound is obtained by concentrating the solvent mixture by evaporation or by precipitation with a non-solvent.

The separated and isolated salts of the D compound and the L compound can be transformed to D- and L-N-benzoyl-DOPA respectively by treating them with acids or bases in the conventional manner. DOPA is obtained by acid saponification of the N-benzoyl compound.

The cinchonine salt of D-N-benzoyl-DOPA crystallized by the invention from the solvent-and-water mixture contains 1 mole of water of crystallization, has a specific rotation of $[\alpha]_D^{20}=+85°$ (c.=1; methanol) and melts at 168° C.

In the infrared spectrum of this substance the following characteristic bands are found:

| | |
|---|---|
| 3380 cm.$^{-1}$ | 1390 cm.$^{-1}$ |
| 1632 cm.$^{-1}$ | 1260 cm.$^{-1}$ |
| 1598 cm.$^{-1}$ | 1102 cm.$^{-1}$ |
| 1580 cm.$^{-1}$ | 770 cm.$^{-1}$ |
| 1560 cm.$^{-1}$ | 718 cm.$^{-1}$ |
| 1496 cm.$^{-1}$ | 635 cm.$^{-1}$ |
| 1468 cm.$^{-1}$ | 572 cm.$^{-1}$ |

If this cinchonine salt is treated with aqueous acids or bases, e.g., aqueous hydrochloric acid, the salt is cleaved. Cinchonine hydrochloride develops, which is soluble in the aqueous phase, and D-N-benzoyl-DOPA, is extracted from the aqueous hydrochloric acid layer with acetic ester.

After the removal of the solvent and recrystallization of the residue from water, D-N-benzoyl-DOPA is obtained as a colorless crystalline substance of MP 170° C. and a specific rotation of $[\alpha]_D^{20}=+30°$ (c.=1; methanol).

The infrared spectrum of this substance contains the following characteristic bands:

| | |
|---|---|
| 3400 cm.$^{-1}$ | 1118 cm.$^{-1}$ |
| 1725 cm.$^{-1}$ | 1078 cm.$^{-1}$ |
| 1632 cm.$^{-1}$ | 960 cm.$^{-1}$ |
| 1600 cm.$^{-1}$ | 946 cm.$^{-1}$ |
| 1570 cm.$^{-1}$ | 880 cm.$^{-1}$ |
| 1533 cm.$^{-1}$ | 870 cm.$^{-1}$ |
| 1511 cm.$^{-1}$ | 801 cm.$^{-1}$ |
| 1318 cm.$^{-1}$ | 790 cm.$^{-1}$ |
| 1282 cm.$^{-1}$ | 695 cm.$^{-1}$ |
| 1233 cm.$^{-1}$ | 574 cm.$^{-1}$ |
| 1182 cm.$^{-1}$ | |

If D-N-benzoyl-DOPA is saponified by boiling with acids, especially hydrochloric acid, pure D-3,4-dihydroxyphenylalanine is obtained, MP=274° C. (decomp.); $[\alpha]_D^{20}=+11.3°$.

By concentrating the mother liquor of the D salt, the cinchonine salt of L-N-benzoyl-DOPA is obtained, which, after recrystallization from acetic ester, has a melting point of 154–155° C. and a specific rotation of $[\alpha]_D^{20}=+135°$ C. (c.=1; methanol).

The following characteristic bands occur in the infrared spectrum of the substance:

| | |
|---|---|
| 3385 cm.$^{-1}$ | 1382 cm.$^{-1}$ |
| 1625 cm.$^{-1}$ | 1276 cm.$^{-1}$ |
| 1585 cm.$^{-1}$ | 1108 cm.$^{-1}$ |
| 1566 cm.$^{-1}$ | 918 cm.$^{-1}$ |
| 1502 cm.$^{-1}$ | 795 cm.$^{-1}$ |
| 1474 cm.$^{-1}$ | 768 cm.$^{-1}$ |
| 1435 cm.$^{-1}$ | 708 cm.$^{-1}$ |

If the cinchonine salt of the L-N-benzoyl-DOPA is cleaved as described in the case of the D-salt, the L-N-benzoyl-DOPA is obtained after the organic phase has been processed, in the form of a colorless crystalline substance having a melting point of 172° C. and a specific rotation $[\alpha]_D^{20}=-30°$ (c.=1; methanol).

In the infrared spectrum of this substance the following characteristic bands are found:

| | |
|---|---|
| 3340 cm.$^{-1}$ | 1185 cm.$^{-1}$ |
| 1695 cm.$^{-1}$ | 1150 cm.$^{-1}$ |
| 1625 cm.$^{-1}$ | 1140 cm.$^{-1}$ |
| 1588 cm.$^{-1}$ | 1105 cm.$^{-1}$ |
| 1562 cm.$^{-1}$ | 959 cm.$^{-1}$ |
| 1530 cm.$^{-1}$ | 932 cm.$^{-1}$ |
| 1505 cm.$^{-1}$ | 922 cm.$^{-1}$ |
| 1478 cm.$^{-1}$ | 890 cm.$^{-1}$ |
| 1425 cm.$^{-1}$ | 798 cm.$^{-1}$ |
| 1355 cm.$^{-1}$ | 711 cm.$^{-1}$ |
| 1340 cm.$^{-1}$ | 682 cm.$^{-1}$ |
| 1272 cm.$^{-1}$ | 578 cm.$^{-1}$ |
| 1210 cm.$^{-1}$ | |

If the L-N-benzoyl-DOPA is saponified by boiling with hydrochloric acid, pure L-3,4-dihydroxyphenylalanine is obtained, M.P. 290° C. (decomp.), $[\alpha]_D^{20}=-11.3°$.

The N-benzoyl-3,4-dihydroxyphenylalanine is, as noted above a suitable material from which 3,4-dihydroxyphenylalanine can be made. This last above mentioned compound has utility as a constituent of proteins.

This invention will be illustrated by the following examples which are in no way to be considered as limiting. Parts and percentages are by weight unless expressly stated to the contrary.

EXAMPLES

Example 1

(a) Preparation of the cinchonine salt of D-N-benzoyl-DOPA: In an Erlenmayer flask 159.5 g. rac. N-benzoyl-DOPA monohydrate (0.5) and 147 g. of cinchonine (0.5 mole) are dissolved in about 750 ml. of methanol and the solution is filtered into a 4-liter round flask, and the solvent is removed by heating in a water-jet vacuum. The syrupy salt residue is dissolved with vigorous shaking or stirring in a boiling mixture of 2.5 l. of acetone and 250 ml. of water.

Immediately the cinchonine salt of D-N-benzoyl-DOPA begins to crystallize. To complete the crystallization the mixture is let stand overnight at room temperature or in a refrigerator. The crystals are suction filtered and washed with thoroughly chilled aqueous acetone (approx. 10% water).

Yield: 150.25 g. (=98% of the theory).

The substance is sufficiently pure for further processing to D-N-benzoyl-DOPA and therefore does not need to be further purified.

For the analytical studies a portion of the substance was recrystallized from the acetone-water mixture. It then showed the following characteristics: M.P.=168° C.; $[\alpha]_D^{20}=+85°\pm2°$ (c.=1; methanol). Infrared spectrum as described above.

(b) Preparation of D-N-benzoyl-DOPA: To isolate D-N-benzoyl-DOPA, 100 ml. of semiconcentrated HCl and 400 ml. of acetic ester are added to 150 g. of the cinchonine salt of D-N-benzoyl-DOPA that has been crystallized under 1(a) above from the solvent mixture, and the mixture is shaken until dissolution has taken place. The organic layer is separated, and the aqueous layer is extracted 5 times with 200 ml. of ethyl acetate each time.

The combined acetate ester layers are washed with water, dried with $Na_2SO_4$ and concentrated in a water-jet vacuum. D-N-benzoyl-DOPA is obtained as a residue which is sufficiently pure for further processing to D-DOPA.

Yield: 71 g. (96.50% of the theory).

For the analytical studies a portion of the substance was recrystallized from water. The following characteristics were then obtained: M.P. 170° C; $[\alpha]_D^{20}=+30°\pm2°$ (c.=1; methanol); infrared spectrum as described above.

(c) Preparation of D-dihydroxyphenylalanine: 50 g. of D-N-benzoyl-DOPA is boiled for 2 hours with about 255 ml. of 20% hydrochloric acid under nitrogen as a shielding gas. During the cooling that follows, a portion of the released benzoic acid crystallizes and is filtered out. The remainder is extracted from the solution with ether. The aqueous solution is concentrated to the dry state under shielding gas (nitrogen).

The D-3,4-dihydroxyphenylalanine hydrochloride is dissolved in water and the solution obtained is adjusted to the isoelectric point with a base, such as triethylamine. After a considerable period of standing in a refrigerator (overnight is best), 31.5 g. of D-DOPA crystallize (=96% of the theory), having a melting point of 274° C. (decomposition); specific rotation $[\alpha]_D^{20}=11.3°\pm0.5°$ (c.=1; 1 N HCl).

(d) Production of the cinchonine salt of L-N-benzoyl-DOPA: If the mother liquor obtained under 1(a) above after the suction filtering and washing of the D salt crystals is evaporated in the water jet vacuum to the dry state and the residue is washed with ethyl acetate, the crude cinchonine salt of L-N-benzoyl-DOPA is obtained in a yield of 95–99% of the theory. The compound is pure enough for further processing to L-N-benzoyl-DOPA and L-DOPA.

For the analytical studies a portion of the substance was recrystallized from acetic ester. The following characteristics were determined: M.P.=154–155° C.; $[\alpha]_D^{20}=+135°\pm2°$ (c.=1; methanol). Infrared spectrum as described above.

(e) Preparation of L-N-benzoyl-DOPA: 100 ml. of semiconcentrated hydrochloric acid and 400 ml. of acetic ester are added to 150 g. of the cinchonine salt of L-N-benzoyl-DOPA obtained under 1(d) above. The acetate layer is separated, and the aqueous layer is shaken 5 times with 200 ml. of ethyl acetate each time. The combined acetate ester extracts are washed with water, dried with $Na_2SO_4$ and concentrated in a water-jet vacuum. As the residue, one obtains L-N-benzoyl-DOPA which is sufficiently pure for further processing to L-DOPA.

Yield 72 g. (=96% of the theory).

A portion of the substance was recrystallized from water to determine the analytical data. M.P.=172° C.; $[\alpha]_D^{20}=-30°\pm2°$ (c.=1; methanol). Infrared spectrum as described above.

(f) Preparation of L-DOPA: 50 g. of L-N-benzoyl-DOPA is boiled for 2 hours with about 225 ml. of 20% hydrochloric acid under shielding gas (nitrogen). During the cooling that follows, a portion of the liberated benzoic acid crystallizes and is removed by filtration. The remainder is extracted from the solution with diethyl ether. The aqueous solution is concentrated under shielding gas (nitrogen) to the dry state. The L-3,4-dihydroxyphenylalanine hydrochloride is dissolved in water and the solution is adjusted to the isoelectric point with a base such as triethylamine. After relatively long standing in the refrigerator (overnight is best), 31 g. of L-DOPA crystallizes (=92% of the theory). After recrystallization from water containing $SO_2$, 30.0 g. are obtained of L-DOPA (=89% of the theory); M.P. 290° C. (decomposition). $[\alpha]_D^{20}=-11.3°\pm0.5°$ (c.=1; 1 N HCl).

Example 2

(a) Preparation of the cinchonine salt of D-N-benzoyl-DOPA: 159.5 g. of racemic N-benzoyl-DOPA monohydrate (0.5 mole), 147 g. of cinchonine (0.5 mole), 2.5 l. of acetone and 250 ml. of water are placed in a 4-liter round flask and heated at ebullition until the initially coarsely crystalline mixture has been transformed to a homogeneous, finely crystalline mass. This is the case in about 2 hours. To complete the crystallization the mixture is let stand overnight at room temperature or even in a refrigerator.

Then the crystals are suction filtered and washed with thoroughly chilled aqueous acetone (approx. 10% water). Yield: 148 g. (=96.5% of the theory).

After the recrystallization of a portion of the substance from a water-acetone mixture, the following values are obtained: M.P.=167.5° C.; $[\alpha]_D^{20}=85°\pm2°$ (c.=1; methanol). Infrared spectrum as described above.

If the procedure described under 1(b) and 1(c) is followed, D-N-benzoyl-DOPA and D-DOPA are obtained respectively, with the characteristics and yields specified.

(b) Production of the cinchonine salt of L-N-benzoyl-DOPA: If the mother liquor obtained in Example 2(a), after the suction filtering and washing of the D-salt crystals, is dried by evaporation in the water-jet vacuum and the residue is washed with cold acetic ester, the crude cinchonine salt of L-N-benzoyl-DOPA is obtained. Yield: 93–99% of the theory.

Recrystallization of the crude product from acetic ester yields a substance with the following characteristics: M.P.=153–155° C.; $[\alpha]_D^{20}=+135\pm2°$ (c.=1; methanol).

If the procedure described in Examples 1(e) and 1(f) is followed, L-N-benzoyl DOPA and L-DOPA are obtained respectively, with the characteristics stated.

Example 3

(a) Preparation of cinchonine salt of D-N-benzoyl-DOPA: 159.5 g. of racemic N-benzoyl-DOPA monohydrate (0.5 mole) and 147 g. of cinchonine (0.5 mole) are dissolved in about 750 ml. of methanol in an Erlenmeyer flask as described in Example 1(a). The solution is filtered into a 4-liter round flask and the solvent is removed with heating in a water-jet vacuum. The remanent syrupy salt is dissolved with vigorous shaking or stirring in a boiling mixture of 2 liters isopropanol, 1 liter di-isopropyl ether and 250 ml. water. Soon thereafter the cinchonine salt of D-N-benzoyl-DOPA commences to crystallize. To complete the crystallization the mixture is let stand overnight at room temperature or in a refrigerator. The crystals are suction filtered and washed with well chilled aqueous acetone or with diisopropyl ether.

The product thus obtained is sufficiently pure for further processing. Yield: 149 g. (=97.27% of the theory). Recrystallization from a mixture of acetone and water, as in Example 1(a), or from a mixture of isopropanol, diisopropyl ether and water, yields a substance with the following chartcteristics: M.P.=167–168° C.;

$$[\alpha]_D^{20} = 85° \pm 2°$$

(c.=1; methanol). Infrared spectrum as described above.

If the procedure described under 1(b) and 1(c) is followed, D-N-benzoyl-DOPA and D-DOPA are obtained, respectively, with the same characteristics and yields as described.

(b) Preparation of cinchonine salt of L-N-benzoyl-DOPA: If the mother liquor obtained in Example 3(a) is evaporated to the dry state in vacuo after the suction filtering and washing of the D-salt crystals, and the residue is washed with cold acetic ester or diisopropyl ether, the crude cinchonine salt of L-benzoyl-DOPA is obtained. Yield: 93–99% of the theory. Recrystallization from acetic ester yields a substance with the following characteristics: M.P.=154–155° C., $[\alpha]_D^{20} = +135° \pm 2°$ (c.=1; methanol). Infrared spectrum as described above.

Example 4

(a) Preparation of cinchonine salt of D-N-benzoyl-DOPA: 159.5 g. of racemic N-benzoyl-DOPA and 147 g. of cinchonine are dissolved in an Erlenmeyer flask in 2 liters of isopropanol, with heating, the solution is clarified with active charcoal and filtered into a 4-liter round flask. The mixture is heated to ebulition and 1 liter of diisopropyl ether and 250 ml. of water are added to the boiling solution, and the solution is then boiled for an additional short period and cooled. Soon thereafter the cinchonine salt of D-N-benzoyl-DOPA commences to crystallize. After standing overnight at room temperature or in the refrigerator, the crystallization has ended. The crystals are suction filtered and thoroughly washed with chilled acetone or with diisopropyl ether. The product obtained is sufficiently pure for further processing: Yield: 145 g. (=94.75% of the theory). Recrystallization from an acetone-water mixture, as in Example 1(a), or from a mixture of isopropanol, diisopropyl ether and water, yields a substance with the following characteristics: M.P.=167–168° C.; $[\alpha]_D^{20} = +85° \pm 2°$ (c.=1; methanol). Infrared spectrum as described above.

(b) Preparation of cinchonine salt of L-N-benzoyl-DOPA: The procedure described in Example 3(b) is followed and a substance is obtained which has the same characteristics as described therein.

Example 5

(a) Preparation of cinchonine salt of D-N-benzoyl-DOPA: 159.5 g. of racemic N-benzoyl-DOPA monohydrate (0.5 mole) and 147 g. of cinchonine (0.5 mole) are dissolved in about 750 ml. of methanol in an Erlenmyer flask as described in Example 1(a), the solution obtained is filtered into a 4-liter round flask, and the solvent is removed by heating in a water-jet vacuum. The remaining salt is dissolved with vigorous shaking or stirring in a boiling mixture of 3-liters of methyl ethyl ketone, 100 ml. of isopropanol and 200 ml. of water. Soon thereafter the cinchonine salt of D-N-benzoyl-DOPA begins to crystallize. To complete the crystallization, the mixture is let stand overnight. The crystals are suction filtered and washed with thoroughly chilled aqueous acetone or diisopropyl ether. Yield: 1455 g. (94.75% of the theory).

After recrystallization the substance has the following characteristics: MP=166–168° C.; $[\alpha]_D^{20} = +85° \pm 2°$ (c.=1; methanol). Infrared spectrum same as described above.

If the procedure described under 1(b) and 1(c) is followed, D-N-benzoyl-DOPA and D-DOPA are obtained, respectively, having the same characteristics and yields as described.

(b) Preparation of cinchonine salt of L-N-benzoyl-DOPA: If the mother liquor obtained after the suction filtering and washing of the D-salt crystals obtained in Example 5 is evaporated in vacuo to the dry state and the residue is washed with cold acetic ester or diisopropyl ether, the crude cinchonine salt of L-benzoyl-DOPA is obtained. Yield: 95–99% of the theory. Recrystallization yields a substance with the following characteristics: M.P.=154–155° C.; $[\alpha]_D^{20} = +135° \pm 2°$ (c.=1; methanol). Infrared spectrum same as described above.

Example 6

(a) Preparation of cinchonine salt of D-N-benzoyl-DOPA: 159.5 g. of rac. N-benzoyl-DOPA monohydrate (0.5 mole), 147 g. of cinchonine (0.5 mole) and about 3 liters of water-saturated n-butanol are placed in a 4-liter round flask and heated at ebullition until dissolution occurs. After cooling the crystallization begins, and after the mixture has been let stand overnight the crystallization has ended. The crystals are suction filtered and washed with well-chilled acetone or diisopropyl ether. Yield: 146 g. (95% of the theory). Recrystallization yields a substance with the following characteristics: M.P.=168° C.; $[\alpha]_D^{20} = +85° \pm 2°$ (c.=1; methanol). Infrared spectrum as described above.

(b) Preparation of cinchonine salt of L-N-benzoyl-DOPA: If the mother liquor that is obtained in Example 6(a) after the suction filtering and washing of the D-salt crystals is evaporated in a water-jet vacuum to the dry state and the residue is washed with cold acetic ester, the crude cinchonine salt of L-N-benzoyl-DOPA is obtained. Yield: 93 to 99% of the theory. After recrystallization the substance has the following characteristics: M.P.=154–155° C.; $[\alpha]_D^{20} = +135 \pm 2°$ (c.=1; methanol). Infrared spectrum same as described above.

Example 7

(a) Preparation of cinchonine salt of D-N-benzoyl-DOPA: 159.5 g. of racemic N-benzoyl-DOPA monohydrate, 147 g. of cinchonine, 3 liters of isopropanol and 300 ml. of water are put into a 4-liter round flask and the mixture is heated at ebullition until dissolution has occurred. After the solution is cooled to room temperature the crystallization begins and is completed after standing overnight. The crystals are suction filtered and washed with well chilled aqueous acetone or diisopropyl ether. Yield 144 g. (=94% of the theory). After recrystallization the substance has the following characteristics: M.P.=166° C.; $[\alpha]_D^{20} = +85° \pm 2°$ (c.=1; methanol). Infrared spectrum same as described above.

(b) Preparation of cinchonine salt of L-N-benzoyl-DOPA: The procedure described in Example 3(b) is followed and a substance is obtained having the same characteristics as described in that example.

Example 8

(a) Preparation of cinchonine salt of D-N-benzoyl-DOPA: 159.5 g. of racemic N-benzoyl-DOPA and 147 g. of cinchonine are dissolved by heating in 2 liters of ethanol in an Erlenmeyer flask, the solution is clarified with active charcoal, and filtered. It is then heated or ebullition and 1 liter of water is added to it; it is boiled for a short time and then let cool. Soon thereafter the cinchonine salt of D-N-benzoyl-DOPA begins to crystallize. After standing overnight or in the refrigerator the crystallization has ended. The crystals are suction filtered and washed. Yield: 148 g. (=96.5% of the theory). Recrystallization yields a substance with the following characteristics: M.P.=166–168° C.; $[\alpha]_D^{20}=+85\pm2°$ (c.=1; methanol). Infrared spectrum same as described above.

(b) Preparation of cinchonine salt of L-N-benzoyl-DOPA: The procedure described in Example 3(b) is followed and a substance is obtained having the same characteristics as described therein.

What is claimed is:

1. The cinchonine salt of D-N-benzoyl-3,4-dihydroxyphenylalanine.

2. The cinchonine salt of L-N-benzoyl-3,4-dihydroxyphenylalanine.

3. A method of isolating the pure optical antipodes D- and L-N-benzoyl-3,4-dihydroxyphenylalanine comprising forming a cinchonine salt of racemic N-benzoyl-3,4-dihydroxyphenylalanine at a temperature of at least 20° C. and up to the boiling point of any solvent used; separating such salt into its optical antipodes by crystallization thereof from a homogeneous liquid phase containing water and at least one member selected from the group consisting of an alkyl ketone, an alkanol and an alkyl ether having 2 to 6 carbon atoms wherein said homogeneous liquid phase contains at least one mole of water per mole of the racemic N-benzoyl-3,4-dihydroxyphenylalanine and the mole ratio of water to ketone being 1 to 2.5 when a ketone is employed, the mole ratio of water to alcohol when an alcohol is employed being 1 to 0.5–3.0 and the mole ratio of water to ether when an ether is employed being between 1 to 1.0–3.0 and dissociating the D- and L-cinchonine salt respectively obtained in each case by reaction of said salt with an acid or base which provides dissociation of the cinchonine salt so formed.

4. A process claimed in claim 3, wherein the crystallization is performed from a mixture of water and acetone.

5. A process claimed in claim 3, including reacting racemic N-benzoyl-3,4-dihydroxyphenylalanine with cinchonine in the presence of said homogeneous liquid and including recovering such from said liquid.

6. A process of producing D- or L-3,4-dihydroxyphenylalanine comprising:
  reacting racemic N-benzoyl - 3,4 - dihydroxyphenylalanine with cinchonine to produce a DL-salt at a temperature of at least 20° C. up to the boiling point of any solvent used;
  dissolving the DL-salt in a homogeneous liquid consisting essentially of water mixed with at least one member selected from the group consisting of alkyl ketones, alkanols and alkyl ethers having 2 to 6 carbon atoms wherein said homogeneous liquid phase contains at least one mole of water per mole of the racemic N-benzoyl-3,4-dihydroxyphenylalanine and the mole ratio of water to ketone being 1 to 2.5, the mole ratio of water to alcohol being 1 to 0.53.0 and the mole ratio of water to ether being 1 to 1.0–3.0;
  crystallizing said D- or said L-salt respectively from said solution while leaving the other in solution;
  recovering said crystallized salt;
  hydrolyzing said crystallized salt to a substantially pure N-benzoyl-3,4-dihydroxyphenylalanine; and
  hydrolyzing said N-benzoyl - 3,4 - dihydroxyphenylalanine to the corresponding optical isomer of 3,4-dihydroxyphenylalanine.

References Cited

Vogler et al.: Helv. Chem. Acta 35, 1776 (1952).

Greenstein et al.: "Chemistry of the Amino Acids," Wiley & Sons, Inc. (1961), pp. 715–728, 2714, 2718–2719.

LORRAINE H. WEINBERGER, Primary Examiner

J. F. TERAPANE, Assistant Examiner

U.S. Cl. X.R.

260—519

UNITED STATES PATENT OFFICE
CERTIFICATE OF CORRECTION

Patent No. 3,794,655      Dated February 26, 1974

Inventor(s) Hans Schubel, Paul Janssen and Heinz Ratz

It is certified that error appears in the above-identified patent and that said Letters Patent are hereby corrected as shown below:

Column 1, line 58 (in the formula)

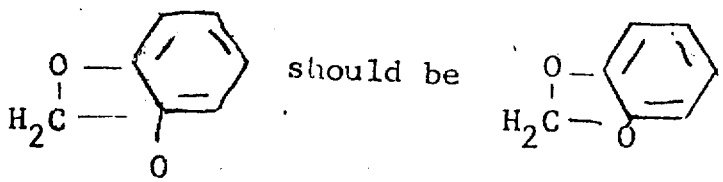

Column 2, line 27 (in the formula)

-COO-   should be   -COOH-

Column 2, line 47

"reacemate" should be "racemate"

Column 7, line 37

"ebulition" should be "ebullition"

Column 8, line 71

"heated or ebullition" should be "heated at ebullition"

Column 10, line 17 (at the end)

"0.53.0" should be   -- 0.5-3.0 --.

Signed and sealed this 17th day of September 1974.

(SEAL)
Attest:

McCOY M. GIBSON JR.              C. MARSHALL DANN
Attesting Officer                Commissioner of Patents